United States Patent [19]

Florindi et al.

[11] Patent Number: 5,684,866

[45] Date of Patent: Nov. 4, 1997

[54] METHOD AND APPARATUS FOR ACCESS TO TELEPHONE OPERATOR SERVICES

[75] Inventors: Robert P. Florindi, Springfield, N.J.; Reginald V. McKoy, Silver Spring, Md.; Robert D. Farris, Sterling, Va.

[73] Assignee: Bell Atlantic Network Services, Inc., Arlington, Va.

[21] Appl. No.: 398,938

[22] Filed: Mar. 3, 1995

[51] Int. Cl.[6] .................... H04M 15/00; H04M 3/42; H04M 7/00

[52] U.S. Cl. .................... 379/114; 379/115; 379/207; 379/220; 379/223; 379/229; 379/230

[58] Field of Search .................... 379/111, 112, 379/113, 114, 115, 118, 121, 122, 127, 142, 144, 207, 219, 220, 223, 229, 230, 245, 221

[56] References Cited

U.S. PATENT DOCUMENTS

| | | | |
|---|---|---|---|
| 4,054,756 | 10/1977 | Comella | 379/223 |
| 4,922,519 | 5/1990 | Daudelin | 379/122 |
| 5,008,929 | 4/1991 | Olsen | 379/115 |
| 5,163,083 | 11/1992 | Dowden | 379/223 |
| 5,181,237 | 1/1993 | Dowden | 379/223 |
| 5,222,120 | 6/1993 | McLeod | 379/196 |
| 5,339,352 | 8/1994 | Armstrong et al. | 379/58 |
| 5,515,425 | 5/1996 | Penzias | 379/113 |

*Primary Examiner*—Curtis Kuntz
*Assistant Examiner*—Vijay Shankar
*Attorney, Agent, or Firm*—Lowe, Price, LeBlanc & Becker

[57] ABSTRACT

A method and system for providing operator services to an interexchange carrier for completing a long distance telephone call for which an operator service is indicated. The interexchange carrier call requiring operator services is connected from the interexchange carrier (IXW) network to a point-of-presence (POP) of the interexchange carrier within a local access transport area (LATA). From the POP the call is connected to an operator service system (OSS) external to the IXC network and within the LATA. The OSS completes the call in accordance with a request for service from the caller. An SS7 signaling system is used to route calls from a terminating switch in the interexchange carrier network to an end office, so that the call legs of the operator service system can be switched out of the call path.

42 Claims, 4 Drawing Sheets

METHOD AND APPARATUS FOR ACCESS TO TELEPHONE OPERATOR SERVICES

TECHNICAL FIELD

This invention relates to operator services for telephone systems, and in particular to methods and apparatus whereby a local exchange carrier can provide operator services for telephone calls to be carried by an interexchange or other long-distance carrier.

BACKGROUND ART

There are a variety of telephone calls that require the assistance of an operator for completion. Among these are alternative billing calls, for which calling charges are to be billed to an account other than that of the telephone from which the call is placed. These include certain charge card calls, collect calls, calls that are to be billed to a third party, and person-to-person calls. Although human operators are still rather extensively used to provide the services that these calls require, fully automated operator services, operable without human intervention, are now also widely used, and it is common in many contexts to simply speak of "operator services" without regard for whether the services are automated or not.

For call routing, under the present scheme of things, a local exchange carrier (LEC) can carry calls that are intra-LATA, but it must pass inter-LATA calls to an interexchange carrier (IXC) for ultimate delivery outside the originating LATA (i.e., a "local access transport area", of which there are over 200 in the Country). As far as operator services are concerned, the current practice is for local exchange carriers to be responsible for providing operator services for calls carried within their own network, and interexchange carriers to be responsible for providing operator services for calls conveyed in the interexchange network (even though the calls may originate through a local exchange carrier). Either carrier may, of course, procure operator services from another party altogether. In any case, calls requiring operator services are, as a rule, routed to an operator services platform operated by or for one of the carriers or the other (e.g., a LEC or an IXC), depending on the inputs from a caller who wants to use such services. In most cases, the digits dialed from the calling telephone station are used to determine which operator platform will initially be reached. The operator platform is set up to provide the services, either automatically, by a live operator, or by a combination of the two.

Since most interexchange carrier calls originate with one local exchange carrier or another, some consideration has been given to having a local exchange carrier provide operator services for those IXC calls that require them. One reason that this has not been widely done, however, is because of the difficulty in providing services from one central location (or, at most, a few) for telephone calls that originate from a wide geographic area, from various local exchange carriers, and from numerous end-offices. Thus, if a LEC is to provide operator services for an IXC, it would certainly be desirable for the IXC to be able use the services even for calls that originate through local exchange carriers other than the one providing the operator services.

An interexchange call that requires operator services, even if initially received by a local exchange carrier, is typically passed through to an interexchange carrier and that carrier is then, as mentioned above, responsible for providing whatever operator services are needed. The interexchange carrier may, on its own, provide the services, or it may turn to other entities to furnish them. The call must, however, be conveyed to an appropriate facility (or platform) capable of performing the services. For a local exchange carrier to furnish operator services for an interexchange call, for example, it is usually contemplated that the call will be re-trunked from the interexchange carrier to an operator services switch of the LEC, using the same kind of operator service trunks (i.e., OSS trunks) that the LEC uses to trunk its own operator service calls. Local exchange carriers typically provide operator services for their own calls by using special operator service trunks that run from the carrier's end-offices to an operator services switch. An operator service trunk is required because it has capabilities particularly needed to provide the signaling required to support the services. A call requiring operator services is routed over one of these trunks to the operator services switch and then to an operator services platform that handles the call.

One of the problems with this, however, particularly when considering trunking for servicing IXC calls, is that these kinds of trunks are expensive. Furthermore, once a call has been conveyed to an operator services platform from an IXC network and the operator services completed, it is desirable that the platform and the route (including the trunk) to it be switched out of the call path. If the call is one of the alternative billing calls, for example, then after the operator has secured approval for acceptance of charges for the call, it is preferable that the call be completed through the interexchange network without maintaining the operator services platform or the trunk in the loop. This has the advantage of freeing up the facilities so that other calls can be handled, and, overall, for a given service capacity, it allows the facilities to be down-sized.

It is among the objects of the present invention, therefore, to provide techniques whereby a local exchange carrier can economically and conveniently furnish operator services for telephone calls that are to be carried by an interexchange carrier network and whereby the services can be obtained without the use of special operator service trunks to reach an operator service platform. It is also among the objects of the invention that the local exchange carrier be enabled to provide such services irrespective of whether the calls originate with it as the service providing LEC or not, and such that, in at least in one aspect of the invention, once a call has been serviced, the call connection to the service facility, or operator service platform, can be removed from the call path.

DISCLOSURE OF THE INVENTION

By the invention, comprising a method and apparatus, a local exchange carrier can provide an interexchange carrier with operator services for certain telephone calls to be carried by an interexchange carrier network. In one form of the invention, the interexchange carrier receives the calls—usually from a central office of a local exchange carrier who maintains the local loop to the calling station—and from information received with each call, the IXC determines whether the call requires operator services for completion or not. Those calls that require operator services are routed to a point-of-presence (POP) maintained by the IXC within a local access transport area (LATA) where the local exchange carrier provides telephone services. Calls arriving at the POP are routed by trunks, which are preferably Feature Group D trunks, to an operator service system operated by the LEC within the LATA where the POP is located. Signaling used on the trunk from the POP to the operator service system provides, for each call, an identity of the calling station (typically the ANI for that station) and an identity of the station being called.

With the call at the operator services system, a menu of available services will be vocally presented to a caller at the calling station, and from that the caller can select one of the services for completing the call. These include credit card calling, collect and person-to-person calling, and calling where third party billing is used. The identities of the calling and called stations provided by the signaling of the trunking system are used for performing the services.

Once the operator services for a call have reached a point at which the call can be completed (i.e., the call is approved for completing to the called station) a separate signaling network interconnecting the operator services system and the IXC network is used to convey messaging from the operator services system to the interexchange carrier network to, in effect, advise that the call can be routed for completion and to cause the IXC network to undertake operations which will complete the call. When a call is completed, the messaging sent via the signaling network also causes the route of the call to the POP to be discontinued so that the call path to the operator service system need not be maintained for the duration of the call. Preferably, the signaling is in the form of standard TCAP messages and the signaling system is a Signaling System 7 (SS7), the operational details for each of which are well known.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

An interexchange telephone call requiring the services of an operator for completion will usually begin in one of two ways. For one, a caller may dial 0+NPA+the called station's directory number (where NPA is the area code). This is often referred to, in short, simply as a 0+ call. The fact that the call requires an interexchange operator, and not a local exchange operator, is automatically determined from the dialed digits following the 0. This is done in essentially the same way that a non-operator call is analyzed to see if it is an intra-LATA call or not. The other usual way to raise an interexchange operator is for the caller to dial 00. The double 0 distinguishes the request for an interexchange operator from one for a local exchange operator. The latter request is usually signaled (at least initially, following a caller going off-hook) by 0—; that is, a 0 without other digits, allowing a time-out to raise an operator. It will be recognized, of course, that although these inputs are used in most situations, a caller may gain access to operator services in other ways as well. For example, a particular 800 number may be made available for reaching an operator service facility. While these alternative ways of getting to an operator may be used with the invention, for brevity and simplicity, the discussion herein will mostly be in terms of a 0+ call.

Figure 1:
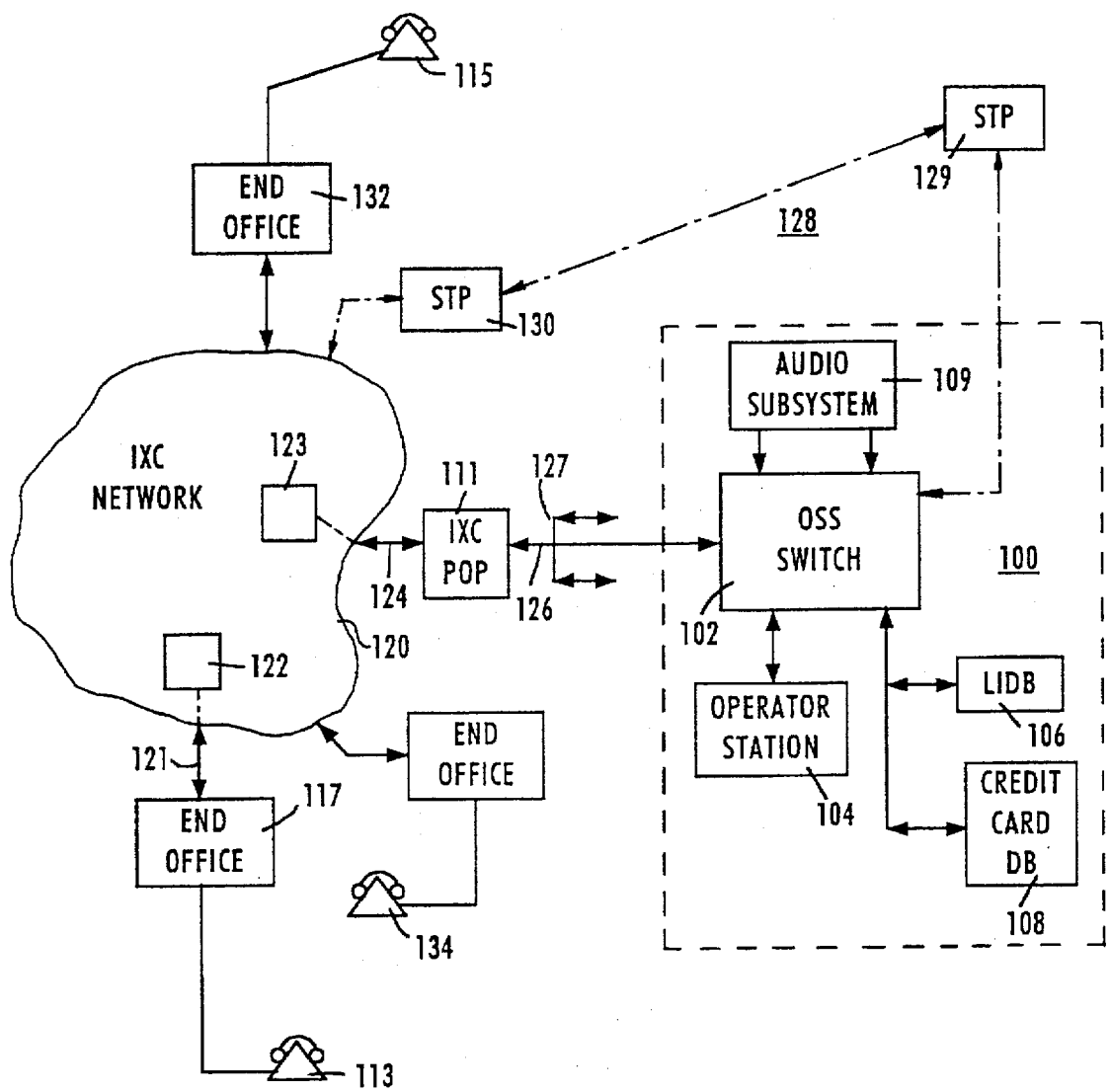
FIG. 1 is a simplified diagram illustrating the operating components of the invention and the architectural framework upon which it operates.

FIG. 1, illustrating the architectural framework for the invention, is referred to initially. In FIG. 1, a local exchange carrier who provides operator services in accordance with the invention maintains an operator service system (OSS) 100 within a LATA where it conducts business. The OSS 100 may be the same facility that the LEC uses for providing operator services for its own intra-LATA calls, but that need not be the case and the OSS 100 may be dedicated to the provision of operator services for interexchange carrier calls as described herein. Conventionally, the OSS 100 includes an operator services switch 102, a number of operator stations such as station 104 (manual or automated) connected to the switch 102, and a plurality of peripheral databases and billing subsystems as required for complete operator services (all of which are not specifically illustrated). Pertinent to the present discussion, however, are the line information database (LIDB) 106, which provides current data relating to particular customer telephone lines, and the credit card database 108 which contains data relating to the validity status of charge cards that may be used for billing calls. The operator services switch 102 permits the operator station 104 to access data from the two databases 106 and 108 for use in processing operator serviced calls. The OSS 100 also includes an audio subsystem 109 connected to the switch 102 for the provision of prompts and other audio messages, and to facilitate voice communications with a caller. As will be discussed more fully, the OSS 100 is also connected to a signaling network 128, such as a Signaling System 7 (SS7) network, and to a point-of-presence (POP) 111 maintained within the LATA by the interexchange carrier whose calls are to be serviced.

In operation, a caller at station 113, seeking to make an inter-LATA call using operator assistance, dials 0+ area code+the 7-digit directory number of the telephone station being called (assumed in this case to be telephone 115). The calling and called stations 113 and 115, respectively, may be located virtually anywhere, and the local exchange carrier at each end of the call may be the same, or the calling and called stations may be served by different local exchange carriers. In any case, the call is initially received at the end-office 117 serving the calling station 113. The dialed digits are analyzed in the end-office and it is recognized therefrom that, although the call includes a request for the services of an operator, it is also an inter-LATA call and must therefore be passed to an interexchange carrier network (such as IXC network 120 in this case) for routing and for provision of the requested operator services. Accordingly, the call is passed to the IXC network 120 in much the same way that any other inter-LATA call would be. That is, the call is passed to the IXC network 120 via a trunk 121 (which may be a Feature Group D trunk as is well known) and the IXC network is provided with the automatic number identification (ANI) of the calling station 113 and with the directory number of the called station 115. The IXC network 120 also receives the dialed 0 as an indication that the call requires operator action for completion. By "completion" it is generally meant that the call routing is complete, either end-toend or through some point in the call path, as will be perceived from the context, not that a particular call session is concluded.

Once the call is received by the IXC network 120 it is routed therein as an operator service call, passing from an originating IXC switch, such as switch 122, ultimately to a terminating IXC switch 123, for example, and from there to the IXC's point-of-presence (POP) 111 located, as was pointed out above, in the LATA where the local exchange carrier operator services are to be provided. Typically, for ordinary telephone services, at least one point-of-presence, as POP 111, is maintained by an interexchange carrier within a LATA for the purpose of interfacing the IXC's network to that of a local exchange carrier operating in that particular LATA. A POP is the place where the IXC and LEC networks usually come together for exchanging telecommunications. For the present invention, the POP 111 may be put in place especially for operator service purposes or it may be a POP used for other telephone traffic and coincidentally used for operator services. The character of the connection 124 between the POP 111 and the IXC is generally at the discretion of the IXC so long as the required information is conveyed, but as an example, the connection could be a standard T1 facility.

The connection from the POP 111 to the OSS 100 is, however, preferably via a trunk 126 in trunk group 127 that provides Feature Group D signaling since the invention takes advantage of that kind of signaling to avoid the need for operator service trunks. Since Feature Group D connections were developed for passing long distance calls between a local exchange carrier and an interexchange carrier, and since they are commonly used for that purpose, it will be recognized that the call, to this point, is handled much as any other interexchange call would be. In this case, however, the OSS switch 102 is programmed to consider calls received from the dedicated trunk 126 as calls that are to receive operator treatment and not the usual treatment. Furthermore, since the OSS switch 102 may serve other purposes, and since the OSS 100 may provide operator services to other IXCs (not illustrated), the identity of the trunk group 127 is used to relate calls received to the particular IXC to which they pertain; i.e., the trunk or trunk group identifies the carrier. The Feature Group D protocol provides the operator services switch 102, and ultimately the operator stations 104, with the ANI of the calling station 113, the number of the dialed station 115, and certain information digits that can be used to identify the origin of the call (e.g., the latter would identify the call as originating from a hotel, hospital, etc.).

Figure 2:
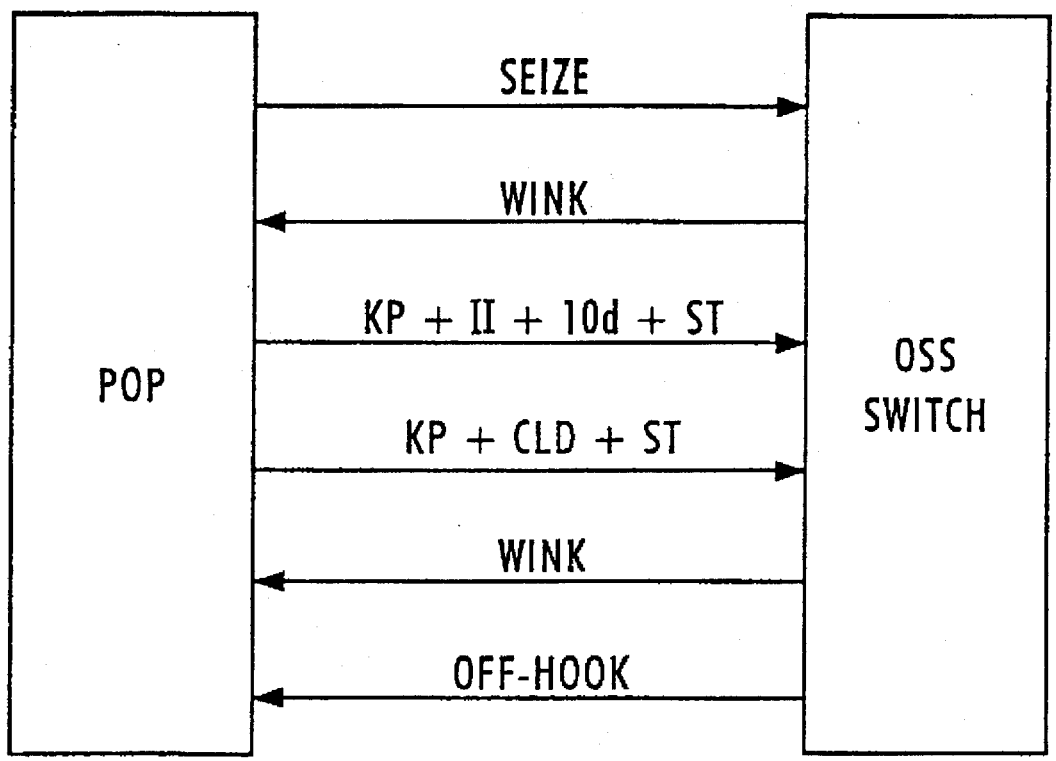
FIG. 2 is a diagram illustrating Feature Group D signaling, preferred for use in providing information relating to a call for which operator services are to be provided.

The use of Feature Group D signaling for other than switched access to an interexchange carrier is disclosed in U.S. Pat. No. 5,339,352 to Armstrong et al. There, a feature Group D trunk is used to interface a mobile telephone switching office (MTSO) to an operator service system to facilitate directory assistance for a cellular telephone customer. That patent (assigned to the assignee of the present invention) is instructive generally with respect to the Feature Group D protocol and its operation, and the patent's disclosure is incorporated herein by reference. For convenience, however, FIG. 2 illustrates the Feature Group D signaling between the POP 111 and the OSS switch 102. The POP 111 initially transmits a trunk Seize signal to the OSS switch 102 via the trunk 126 requesting access. The OSS switch acknowledges the request by transmitting a "wink" signal back over the trunk 126. The first wink signal effectively instructs the POP 111 to outpulse digits via the trunk 126 to the OSS switch 102. In response, the POP 111 sends a first string of characters via the trunk 126. This first string begins with a key pulse signal KP followed by the identifier code II. The II identifier is followed by the ten digit number of the calling station 113. An ST code indicates the end of this first character string. Next, the POP 111 sends a second string of characters via the trunk 126. This second string begins with another key pulse signal KP followed by the dialed destination number. An ST code indicates the end of the second character string. The OSS switch 102 then sends a second wink signal back to the POP indicating that digit transmission is complete. With that, the call path from the calling station 113 to the operator services switch 102 is complete and the switch 102 then operates to connect the call into an appropriate one of the operator stations, such as station 104, for response, either automated or by live operator, depending on the facilities then available and appropriate to handle the call. As a rule, once the call is received, an announcement is then given to the caller to identify the IXC and "brand" the service being provided.

At this point, for a 0+ call, the particular operator service that the call is to receive cannot be determined without further input from the caller since there is yet no basis for determining which one of several alternative services are desired. The call might, for example, be (i) a credit card call, (ii) a collect call, (iii) a call for billing to a third party, or (iv) a person-to-person call since the received digits can be the basis for providing any one these. The operator station 104 is therefore initially operative, along with the audio subsystem 109 as required, to present the caller with a vocal menu of options from which a service selection can be made. Alternatively, of course, an operator can simply query the caller as to what service is needed. As is conventional, the caller may make a selection from the menu either by entry from the DTMF keypad on the telephone or possibly by voice (to an operator or voice recognition equipment located in the operator services system 100). The caller may be asked, for example, to enter or say "1" for a credit card call, "2" for a collect call, "3" for billing the call to a third party, or "4" for a person-to-person call. Once a selection is made, it is detected at the OSS 100 via the established connections and appropriate processing of the call within the operator servicing system 100 is begun, using the information obtained through the Feature Group D signaling (i.e., as needed, the ANI of the calling station, the dialed number, and the source type for the call).

Although the generation of operator services menus, announcements, and so forth, including the processing for any one of the menu selections within the OSS 100 need not be discussed in detail since techniques for that are now well known, a discussion of call routing and control for the various services will complete an understanding the invention's operation. A signaling system, such as system 128 as shown in FIG. 1, is used for such control. The signaling system 128, preferably a Signaling System 7 (an SS7 system) as is well known, is a separate data network that, in this case, interconnects the OSS system 100 and the interexchange network 120 and allows the two to exchange data regarding certain calls being processed as operator service calls. The interconnection of IXC and LEC signaling networks in this way is now in use for effecting certain coordinated operations involving both kinds of networks. The signaling system 128 includes a first signal transfer point (STP) 129 connected to the OSS switch 102, and a second STP 130, connected into the IXC network 120 and its originating and terminating switches 122 and 123 (directly or indirectly through other STPs not illustrated), as appropriate. The two STPs 129 and 130 are connected to each other to complete the interconnection. Signal transfer points deployed as depicted are well known signal system components. Data exchanged between the IXC 120 and the OSS switch 102 may be contained in messages formatted in accordance with the standard Transaction Capabilities Applications Protocol (TCAP) as is commonly done for SS7 systems. The OSS system 100 has the capability, using techniques now well known, to provide these call-related signaling messages. Each message includes data fields for information relating to a current call and its identification.

Considering first the processing of a credit card call (wherein, for example, the caller has entered a "1" from the selection menu), the caller at station 113 is prompted to enter a charge card number (as by DTMF inputs) for billing the call to. The card number is received at the operator station 104 and then a check made in the database 108 to determine whether the number can be accepted for billing the call to. If the charge card number is unacceptable and the call is therefore to be denied, the caller is advised accordingly via the voice path established between the operator station 104 and the calling station 113 (depending on the service, the caller may be given an opportunity to re-enter a card number or to make the call under another billing alternative). If the card number is valid, however, then, in one aspect of the invention, the call is dialed back out from the operator station 104 to the called station 115. This is by way of a Feature Group D trunk within the trunk group 127 and thence through the IXC 120 to the called telephone 115 through a terminating end-office 132. With the call established to the called telephone station 115, the total end-to-end call path, from calling station 113 to the called station 115, can be established by bridging the call legs together in the OSS switch 102.

Alternatively, however, in a preferred form of the invention, once the credit card number is determined within the OSS system 100 to represent a valid account to which the call can be billed, and after the call is in that sense found to be acceptable, rather than completing the call from the OSS system 100 to the called station 115 as described above, a signaling message is sent to the IXC network 120 by way of the signaling network 128, and the IXC network 120 is, by that, advised that the call is approved for completion. Within the IXC network 120 the terminating switch 123 will generally be the object of the message since it is the focal point through which calls pass to the operator service system 100 and since a particular call is therefore identifiable therein without extensive messaging between the IXC network and the OSS system 100. Upon receipt of the message indicating that the call can be completed, the terminating switch 123 causes the call to be routed forward through the IXC network to the end-office 132 and to the called station 115. This avoids the need to establish and maintain the forward call path from the OSS system 100 to the called station 115 (and, hence, the need to bridge call legs together in the OSS switch 102), and allows the initial switched connection to the OSS system to be taken down once the call is complete to the called station 115. Notwithstanding that the terminating switch 123 may be most conveniently directed to complete the call in this way, it is to be recognized that approved calls, as described, may be similarly forward routed from originating switches (or others) within the IXC network 120 (such as switch 122) upon indication from the OSS system 100 that the call is approved. The messaging signal obtained from the IXC's STP 130 may be directed anywhere within the IXC 120, provided there are suitable facilities for handling the message and for acting in response to it.

If the caller at station 113 elects to make a collect call (e.g., by selecting "2" from the menu), before the call can be completed, operator services are needed, as is conventional, to determine if charges for the call will be accepted for billing to the called station (station 115, for example) and for then processing or denying the call, depending on whether the charges are acceptable or not. To determine acceptance of charges, a tentative call goes back from the operator station 104 through the IXC network 120, traversing the terminating switch 123, to the called station 115. Once the call path from the operator station 104 to the receiving telephone 115 is complete, the operator station 104 (manually or automatically) announces the name of the calling party (being previously spoken by the caller and recorded for playback) and asks a responding party at telephone 115 whether charges for the call will be accepted. Additionally, the LIDB database 106 (a line information database) can be accessed by the operator station 104 handling the call to determine therefrom whether there are any restrictions on the calling or called lines that would cause a collect call to be denied in this instance. If there are no restrictions and if the charges will be accepted, the call leg to the operator service system 100 and the call leg back to the called station 115 can be bridged together in the OSS switch 102 for completion of the call.

The need to bridge the legs together in the OSS system and to maintain them for the duration of the call, however, is also avoided in the case of a collect call. This is done by using the OSS system 100 to provide call-related signaling and the message conveying capability of the signaling system 128 to cause the terminating switch 123 (for example) to discontinue the two legs to the OSS system 100, but to maintain the forward call path from the terminating switch 123 to the called station 115. Rather than bridging the call legs together in the operator service system 100, the signaling network 128 is used to cause the IXC network 120 to effectively put the call together so that the OSS system 100 can be dropped from the call path. This occurs once the operator station 104 indicates that the call is approved (i.e., in this case, that the charges for the call will be accepted). With an indication of approval, a signaling message is caused to be formulated and forwarded from the OSS switch 102 via the signaling network 128 to the terminating switch 123 as was outlined above. The message, preferably in the standard TCAP format and formulated to identify the call being handled, triggers a response in the IXC network to cause the call's switched connections to and from the OSS system to be taken down, and to cause connections within the network 120 to be established and maintained for completion of the end-to-end call path from station 113 to called station 115.

The processing and operation for a person-to-person call is quite similar to that performed for a collect call. As with a collect call, a tentative second leg of the call goes out from the operator station 104 to a called station, such as station 115, to see if the call will be accepted. In this instance, acceptance relates not to charges for the call, but to whether a particular called party can accept the call from a particular caller. As with a collect call, the route will usually be by way of the OSS switch 102, a Feature Group D trunk in the trunk group 127, the IXC POP 111, and the IXC network 120, including the terminating switch 123. With contact established to the called station 115, the operator station 104 announces the name of the calling party and of the particular person being called and asks whether the call can be accepted. Notably, acceptance can be indicated by voice response at the called station or by inputs from the receiving telephone keypad (e.g., "1" if acceptable, "2" if not). The LIDB database 106 may also be accessed by the operator station 104 handling the call to determine whether there are any restrictions on the calling or called lines that would cause a person-to-person call to be denied in this instance. If there are no restrictions and if the call is accepted, the call leg to the operator service system 100 and the call leg back to the called station 115 can be bridged together in the OSS switch 102 for completion of the call. Again, however, the need to bridge the legs together and to maintain them for the duration of the call is preferably avoided in the same way that it is avoided when a collect call is processed (described above). The terminating switch 123, upon receipt of an appropriate TCAP message from the operator service system 100 via the signaling network 128, is programmed to discontinue the two legs to the OSS system 100 and to maintain completeness of the forward call path from the terminating switch 123 to the called station 115.

A somewhat more complicated process is required for processing a call that is desired to be billed to a third party (e.g., the caller selects "3" from the menu). In that event, before the call can be completed to the called station 115, operator services are needed to determine if charges for the call will be accepted for billing to a third party station (e.g., station 134 in FIG. 1). For that determination, a call is first made from the operator station 104 (which may be automated) through the IXC network 120 to the third party station 134. This is as described above in connection with other call processing, except that for billing to a third party the initial call is directed to the third party station 134 rather than to the called station 115. Obviously in this instance, the operator station 104 must not only collect the requester's name so that it can be announced at the third party station 134, but it must also gather the third party's directory number so that the initial call can be made and the third party billed if the charges for the call are accepted.

Once the call path is established to the third party telephone 134 and the call is answered there, the name of the party requesting approval for the billing (usually the caller) is announced and a responding party at telephone 134 is asked whether charges for the call will be accepted. Also in this situation, the LIDB 106 may be accessed by the operator station 104 to determine whether the third party line, station 134, has restrictions set against calls billed against it. If there are no restrictions indicated by the data in the LIDB 106, and if the third party billing is accepted, the call to the third party station 134 is terminated and the operator station 104 proceeds to process the call for delivery to the called station 115. Although a call for that can then be placed from the operator station 104 to the called station 115 (the dialed number for station 115 came with the 0+ entry via the Feature Group D signaling over trunk 126) and the call legs bridged together as has been described for other kinds of calls, it is preferable to send a message to the IXC network 120 via the signaling network 128 and, by that, direct that the call to the called station 115 be completed by switching actions taken within the IXC network 120. In effect, an approval signal is given to the IXC network 120 by way of the signaling network 128 indicating that the call can be completed. Actions are then taken in the IXC network 120 to complete the call without having to pass it through the OSS system 100. Most accessibly, for implementation, the terminating switch 123 receives a TCAP message via the signaling network 128 from the OSS system 100 and the switch 123 is directed to forward the call through the network 120 to the called station. The original connection by the switch 123 to the OSS system 100 is caused to be taken down.

Figure 3A:
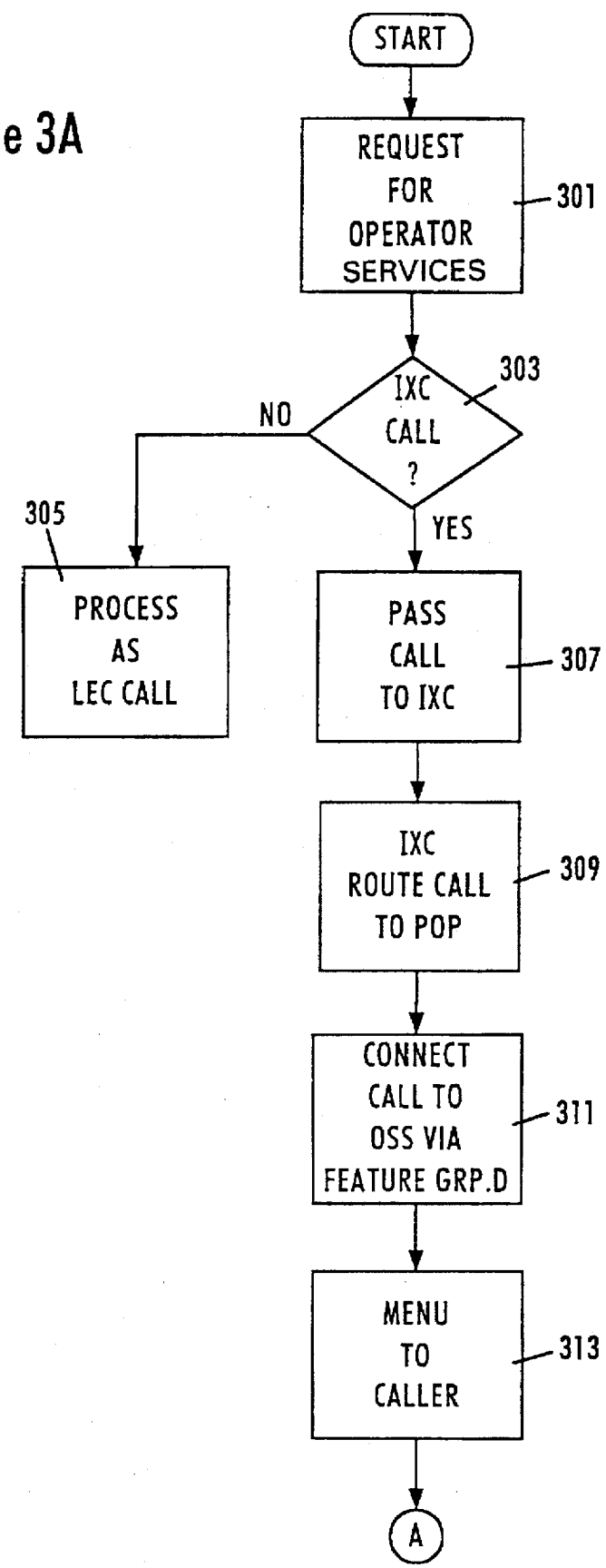
FIGS. 3A and 3B, taken together, provide a simplified block flow chart illustrating the processing operations carried out by the invention.
Figure 3B:
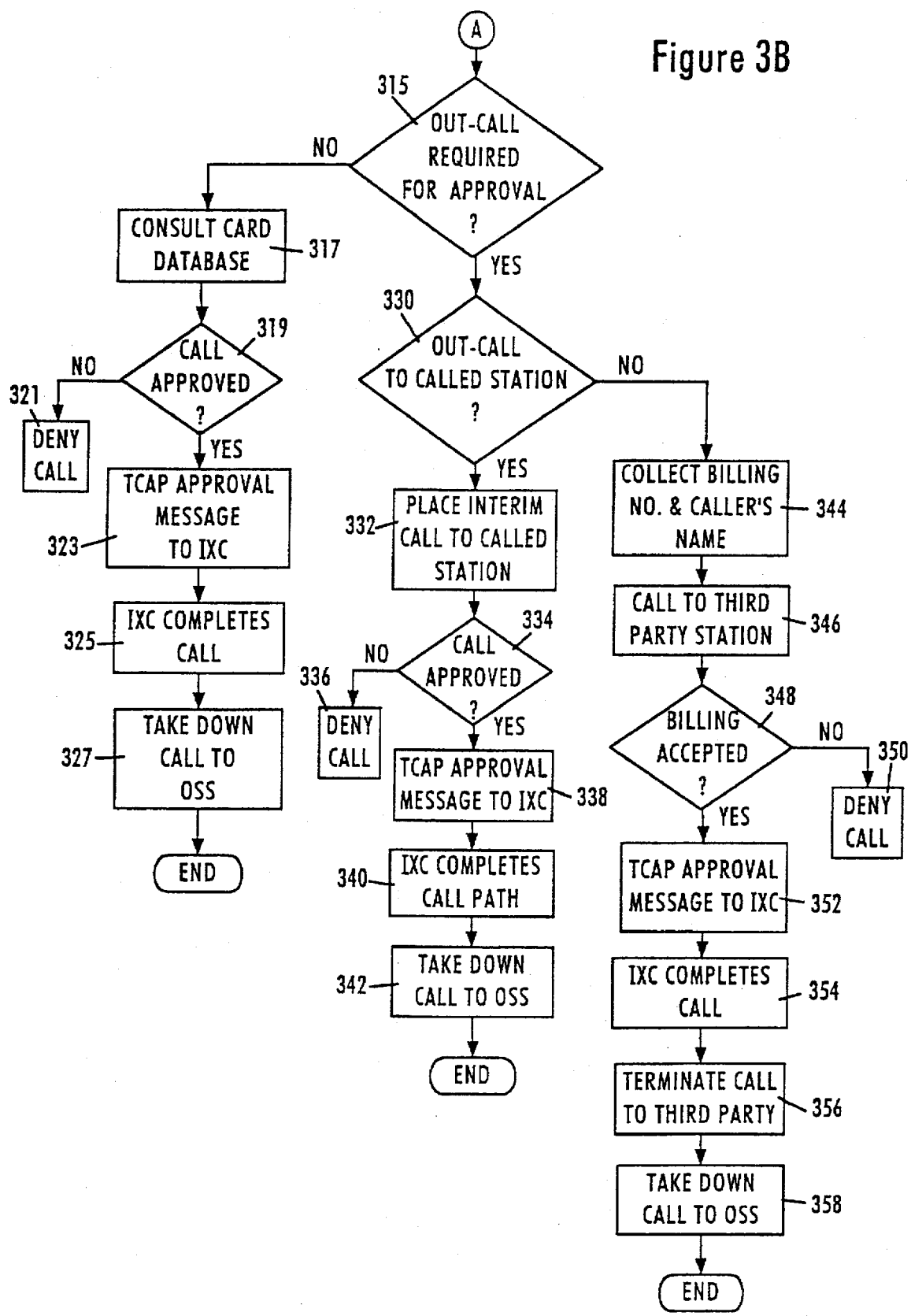

The simplified block flow diagram of FIG. 3, considered in connection with the architectural framework shown in FIG. 1, further illustrates the overall operation of a preferred form of the invention. At the start of the process, at step 301, certain inputs from a caller at a calling station 113 are taken as an indication that the services of a telephone operator are required for processing a call. The caller may, for example, as was discussed above, dial a 0+ number, 0−, 00, or a special 800 number to raise an operator. The end-office 117 receives the dialed digits, and from an analysis thereof determines, in step 303, whether the call requires handling by an interexchange carrier network or if it can be handled as a local exchange carrier call. Processing of local exchange calls are not material to an understanding of the invention, and the call is, in that case, shown to be processed in accordance with that carrier's usual procedures as indicated at step 305. If the call is determined to be an interexchange carrier call, however, step 307 operates to pass the call to the appropriate interexchange carrier network, here network 120. The interexchange carrier may be the particular one pre-subscribed to for the calling station 113 or the caller may have indicated a preference for one interexchange carrier or another by selection digits entered from the calling station 113. In passing the call to the interexchange network 120, it is accompanied by the ANI for the calling station 113, the dialed digits indicative of the called station 115, and certain information digits to designate the station type for the calling station 113 (e.g., whether residential phone, hotel, etc.).

With recognition that the call requires the services of an operator (recognized from the 0 or an 800 number, for example), the IXC network 120, in step 309, routes the call to the IXC's point-of-presence (POP) 111 located in a LATA that includes the operator services system 100. The system 100 is operated by a local exchange carrier authorized to provide telephone services within the LATA. The call may have originated at facilities operated by the same local exchange carrier or it may not have—that is, in this example, end-office 117 where the call originates may or may not be operated by the LEC who operates the operator services system 100. A call may in fact originate within any LATA; it is then up to the IXC to transport the call to its POP 111 within the LATA where services are provided.

From the POP 111, the call is transferred (step 311) by a Feature Group D trunk 126 to the operator services switch 102 within the operator services system 100. The Feature Group D trunk allows the ANI of the calling station 113, the dialed number, and the information digits to be transferred to the OSS switch 102 and ultimately to the operator services station 104 without the use of operator services trunks. The identity of the particular IXC from whom the call passes is identified from the trunk group 127 containing the Feature Group D trunk 126. This is all information that may be used for processing the call, depending on the nature of the services.

At this point, the particular operator service needed to process the call is determined by soliciting inputs from the caller. In a typical automated system, the caller is presented with a vocalized menu of alternative billing options from which a selection is made, as described above. Presentation of the menu and a determination of the caller's selection from it are capsulized in step 313. In the example under consideration, the caller can elect to make a credit card call, a collect call, a bill to third party call, or a person-to-person call. In general, whatever the caller's election, it will require approval for billing. The source of the approval determines how the call is next processed. Thus, in step 315 a determination is made as to whether a call (usually a voice call) has to be made out from the operator services system 100 for approval of the call being handled or whether approval can be determined from operations within (or accessible by) the system 100 without an out-call. Of the services considered, approval for a credit card call does not necessitate an out-call from the operator services system, but the other menu selections do. That is, a call generally has to go back out from the operator services system 100 if the call is collect, for third party billing, or person-to-person, but not if the call is a credit card call.

In step 315, if it is determined that no out-call is required for approval (here, that the card is a credit card call), then further data, such as the charge card number, is collected from the caller, and a database, such as credit card database 108, is consulted to see if the card number is restricted from being used (step 317). In step 319 if the call is not approved, call completion is denied (step 321) and the caller at the calling station 113 is advised accordingly from the operator station 104. If denied, the call between the calling station 113 and the operator service system 100 is concluded conventionally. The service may be set up, however, so that the caller is given other opportunities to re-enter a card number or offered an opportunity to bill the call in one of the other ways.

If the credit card number is valid, and if there are no other restrictions with respect to the calling or called lines (as might be determined from the LIDB 106, for example), then the operator services station 104 initiates, through the switch 102, the formulation and transmission of a TCAP signaling message, pertinent to the call being handled. The message is sent to the IXC network 120 indicating that the call has been approved and giving directions for completion of the call (step 323). The message may most conveniently be directed to and handled by the IXC's terminating switch 123, but that need not be the case. The call is then, in any event, caused to be routed through the IXC network 120 to the terminating end-office 132 and the switched connection from the IXC network to the OSS system 100 is taken down for the call in steps 325 and 327, respectively.

If, at step 315, it is ascertained that the call being handled requires an out-call for approval, then step 330 determines whether or not the out-call has to go to the called station 115 or to some other station; i.e., is the call a collect or person-to-person call, or is it for third party billing. If it is either collect or person-to-person, then approval has to be obtained at the called station 115, and step 332 is executed for placement of an out-call to the called station 115 to see if the call will be accepted. If not accepted (as tested for at step 334) then call completion is denied at step 336 and the caller is advised accordingly. On the other hand, if the call is accepted then the operator station 104, operating through the operator services switch 102, formulates and sends a TCAP message to the IXC network 120, indicating in effect, that the call is approved for completion (step 338). The message is preferably directed to the IXC terminating switch 123, although the exact target for execution can be left to the discretion of the IXC. That is, the signaling message can be taken from the IXC STP 130 and used within the network 120 as best suits the IXC and the need for completion of the call. At steps 340 and 342 the call path is thus completed through the IXC network 120 and the call legs to the OSS system 100 are switched out of the call path.

If it is determined in step 330 that the out-call for approval is not to go to the called station 115, but to a third party station 134 (e.g., the call is for third party billing), then step 344 follows step 330 and it operates to collect and record the third party directory number and the caller's name; the former is for making the call out and for potential billing, the latter is for announcement at the third party station when approval for billing is sought. Next, in step 346, a call to the third party station 134 is made from the operator station 104 for approval of the call billing. Upon response at the station 134, the caller's name is announced and a query is made in step 348 to see if the billing will be accepted. If the call billing is not accepted, the call is denied at step 350 and the switched route of the call between the calling station 113 and the operator service system 100 is taken down conventionally. If the billing is determined to be accepted in step 348, however, and if there are no LIDB restrictions, for example, the operator station 104, in combination with the operator services switch 102, will cause a signaling message to be formulated and sent (step 352) to the IXC network 120 indicating, in effect, that the call has been approved and can therefore be completed to the called station 115 (step 354). The call between the third party station 134 and the operator station 104 is terminated once the signaling message is completed to the IXC network 120, and, as with the other operator service calls, the switched connection from the IXC network 120 to the OSS system 100 is taken down for the call in steps 356 and 358, respectively.

While the foregoing has described what is considered to be a preferred embodiment of the invention, it is understood that various modifications may be made therein. For example, although out-calls from the operator service system, generally required for determining approval for calls being serviced, are preferably routed back through the interexchange network from which they originated and for which operator services are provided, it will be recognized that other call paths, with other carriers, may be used for that purpose and with the result that the call may still be completed through actions taken in the interexchange carrier in response to signaling messages as has been described. It is intended to claim all such modifications which fall within the true spirit and scope of the invention.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A method for providing an interexchange carrier with an operator service for completing a telephone call which is to be carried via an interexchange network and for which an operator service is indicated, comprising the steps of:

(a) connecting the call from the interexchange network to a point of presence (POP) of the interexchange carrier maintained within a local access transport area (LATA);

(b) connecting the call from the POP to an operator services facility external to the interexchange network and within the LATA by a trunking system having a signaling capability providing an identity of a calling station from which the call originates and an identity of a called station to which the call is directed;

(c) communicating with a caller at the calling station and providing said operator service for completing the call in accordance with a request for the service from the caller, using the calling station identity and the called station identity as required to provide the service; and (d) causing the call to be completed through the interexchange network in accordance with the service.

2. The method of claim 1, wherein in step (d) the call is caused to be completed by operations performed within the interexchange network and said operations are initiated by signaling passed to the interexchange network from the operator services facility via a signaling network.

3. The method of claim 2, including the further step of (e) signaling to the interexchange carrier network via the signaling network to cause the connection of the call to the POP and the operator services facility to be discontinued without discontinuing the completion of the call to the called station.

4. The method of claim 3, wherein the trunking system connecting the call from the POP to an operator service facility is a Feature Group D trunking system.

5. The method of claim 4, including a further step whereby an identity for the interexchange carrier is determined from the trunking system and the identity of the interexchange carrier is also used to provide the service, as required.

6. The method of claim 5, wherein the operator service provided is selected from the group consisting of:
 (i) a service for charging the call to a credit card;
 (ii) a service for collect calling;
 (iii) a service for billing the call to a third party; and
 (iv) a service for person-to-person calling.

7. The method of claim 6, wherein the operations within the interexchange network that cause the call to be completed are performed by a terminating switch through which the call is routed to the POP.

8. The method of claim 7, wherein in step (e) the discontinuation of the connection to the POP and the operator services facility is performed by said terminating switch.

9. The method of claim 8, wherein the signaling passed in step (e) is indicative that the call has been approved for completion.

10. The method of claim 9, wherein the signaling is in the form of at least one message formatted in accordance with a standard Transaction Capabilities Applications Protocol (TCAP) and the signaling network is a Signaling System 7 (SS7) network.

11. A method whereby a local exchange carrier can provide an interexchange carrier with an operator service for a telephone call to be carried by an interexchange carrier network, comprising the steps of:
 (a) receiving the call by the interexchange carrier network;
 (b) determining from information received with the call that the call requires operator services for completion;
 (c) routing the call to a point of presence (POP) for the interexchange carrier network within a local access transport area (LATA) in which the local exchange carrier operates;
 (d) connecting the call from the POP to an operator services facility external to the interexchange carrier network and within the LATA by a trunk having a signaling capability providing an identity of a calling station from which the call originates and an identity of a called station to which the call is directed;
 (e) providing said operator service in accordance with a request therefor entered from the calling station, using the identity of the calling station and the identity of the called station as required to provide the service; and
 (f) causing the call to be completed in accordance with the operator service provided.

12. The method of claim 11, wherein the call is caused to be completed by operations performed in the interexchange network, said operations being in response to signaling received from the operator services facility via a separate signaling system.

13. The method of claim 12, including the further step of (g) causing the route to the POP to be discontinued by operations performed in the interexchange network, said operations being in response to said signaling received from the operator services facility.

14. The method of claim 13, wherein the operations performed in the interexchange network for completion of the call and for discontinuing the route to the POP are carried out by a terminating switch through which the call passes to the POP.

15. The method of claim 14, wherein the trunk used to connect the POP to the operator services facility is a Feature Group D trunk.

16. The method of claim 15, wherein the call is received in step (a) by the interexchange network from a facility operated by the local exchange carrier that provides the operator service.

17. The method of claim 15, wherein the call is received in step (a) by the interexchange carrier network from a facility operated by a local exchange carrier other than the one that provides the operator service.

18. The method of claim 16, wherein the operator service provided is selected from the group consisting of charge card calling, collect calling, person-to-person calling, and billing to third party calling.

19. The method of claim 18, wherein an identity for the interexchange network is determined from the trunk used to connect the call from the POP to the operator services facility.

20. The method of claim 19, wherein the signaling received from the operator services facility is in the form of TCAP messages and the signaling system is a Signaling System 7.

21. The method of claim 17, wherein the operator service provided is selected from the group consisting of charge card calling, collect calling, person-to-person calling, and billing to third party calling.

22. The method of claim 21, wherein an identity for the interexchange network is determined from the trunk used to connect the call from the POP to the operator services facility.

23. The method of claim 22, wherein the signaling received from the operator services facility is in the form of TCAP messages and the signaling system is a Signaling System 7.

24. A method for providing an operator service for a telephone call to be carried by an interexchange exchange carrier network, comprising the steps of:
 (a) receiving the call by the interexchange network;
 (b) routing the call to a point of presence (POP) for the interexchange carrier within a local access transport area (LATA);
 (c) connecting the call from the POP to an operator service system external to the interexchange carrier network and within the LATA by a trunk providing signaling to convey an indication of a station number for a calling station from which the call originated and an indication of a station number for a called station to which the call is to be completed;
 (d) providing an operator service for the call using the indication of the calling station number and the indication of the called station number as required, said service entailing a determination of approval for completion of the call to the called station;
 (e) if the call is approved for completion, then formatting an approval message and sending it to the interexchange network by way of a signaling network;

(f) upon receipt of the approval message by the interexchange network, causing the call to be complete through the interexchange network to the called station; and (g) discontinuing the route of the call to the POP.

25. The method of claim 24, wherein the operator service provided for the call is selected by a caller at the called station from the group consisting of:

(i) a credit card calling service;

(ii) a collect calling service;

(iii) a bill to third party calling service; and (iv) a person-to-person calling service.

26. The method of claim 25, wherein the operator service system is operated by a local exchange carrier and the trunk connecting the POP and said operator service system is a Feature Group D trunk.

27. The method of claim 26, wherein the approval message is formatted as a TCAP message and the signaling network is in accordance, at least in part, with a Signaling System 7.

28. The method of claim 27, wherein the call is caused to be complete through the interexchange network by operation of a switch through which the call is routed to the POP.

29. The method of claim 28, wherein the indication of the calling station number is the Automatic Number Identification (ANI) of the calling station.

30. A system by which a local exchange carrier provides an operator service for a telephone call carried by an interexchange carrier network, comprising:

(a) a point-of-presence (POP) to which the call is routed from the interexchange carrier network, said POP being in a local access transport area (LATA) in which the local exchange carrier provides telephone services;

(b) an operator service system external to the interexchange carrier network and within the LATA for receiving the call from the POP and for providing the operator service, using an identity of a calling station from which the call originates and an identity of a called station to which the call is directed, said operator service system being operative to provide call-related signaling messages and being operated by the local exchange carrier in the LATA;

(c) a trunk connecting the POP and the operator service system for conveying the call therebetween, said trunk having a signaling capability providing said operator service system with the identity of the calling station and the identity of the called station; and (d) a signaling system interconnecting the operator service system and the interexchange network whereby said call-related signaling messages are conveyed to the interexchange network to cause operations therein for completing the call through the interexchange network in accordance with the service provided.

31. The system of claim 30, wherein the service provided by the operator service system entails obtaining approval for the call prior to its completion and the call-related signaling messages are in the form of at least one approval message.

32. The system of claim 30, wherein the call-related signaling messages conveyed to the interexchange network are to further cause operations for the routing of the call to the POP to be discontinued once the call is completed.

33. The system of claim 32, wherein the interexchange network includes a terminating switch through which the call is routed to the POP and said switch is adapted to perform the operations for completing the call and for discontinuing its routing to the POP.

34. The system of claim 33, wherein the trunk is a Feature Group D trunk.

35. The system of claim 34, wherein the call related signaling messages are in the form of messages formatted in accordance with the Transaction Capabilities Applications Protocol (TCAP) and the signaling system is in the form of a Signaling System 7.

36. The system of claim 35, wherein the operator service system allows the operator service to be selected by a caller from the group of services consisting of a charge card service, a collect calling service, a bill to third party service, and a person-to-person service.

37. A method whereby a local exchange carrier can provide an interexchange carrier with operator services for certain telephone calls to be carried by an interexchange carrier network, comprising the steps of:

(a) receiving the calls by the interexchange network;

(b) determining from information received with each call whether that call requires an operator service for completion;

(c) routing each call determined to require an operator service to a point-of-presence (POP) for the interexchange carrier network within a local access transport area (LATA) in which the local exchange carrier operates;

(d) connecting calls from the POP to an operator services facility external to the interexchange carrier network and within the LATA by trunks having a signaling capability that provides, for each of the calls, an identity of a called station from which the call originated and an identity of a called station to which the call is directed;

(e) providing operator services for at least some of the calls received at the operator services facility, using the identity of the calling station and the identity of the called station for each call as required to provide a service in accordance with a request therefor entered from the calling station; and (f) causing at least some of the calls for which services are provided to be completed by operations performed in the interexchange network, said operations being in response to signaling received from the operator services facility via a separate signaling system.

38. The method of claim 37, including the further step of (g) for those calls which are completed, causing the route to the POP to be discontinued by operations performed in the interexchange network, said operations being in response to said signaling received from the operator services facility.

39. The method of claim 38, wherein the operations performed in the interexchange network for completion of the calls and for discontinuing the route to the POP are carried out by a terminating switch through which the calls are routed to the POP.

40. The method of claim 39, wherein the trunks used to connect the POP to the operator services facility are Feature Group D trunks.

41. The method of claim 40, wherein the operator service provided for each call is selected from the group consisting of charge card calling, collect calling, person-to-person calling, and billing to third party calling.

42. The method of claim 41, wherein the signaling received from the operator services facility is in the form of TCAP messages and the signaling system is a Signaling System 7.

* * * * *